United States Patent [19]
John et al.

[11] Patent Number: 6,022,500
[45] Date of Patent: Feb. 8, 2000

[54] POLYMER ENCAPSULATION AND POLYMER MICROSPHERE COMPOSITES

[75] Inventors: Vijay T John, Kenner; Gary L McPherson, Mandeville, both of La.; Joseph A Akkara, Holliston; David L Kaplan, Stow, both of Mass.

[73] Assignee: The United States of America as represented by the Secretary of the Army, Washington, D.C.

[21] Appl. No.: 08/756,879

[22] Filed: Sep. 25, 1996

Related U.S. Application Data

[60] Provisional application No. 60/004,377, Sep. 27, 1995.

[51] Int. Cl.$^7$ .............................. B01J 13/04; B01J 13/20; B01J 13/08; B01J 13/16
[52] U.S. Cl. .......................... 264/4.1; 264/4.3; 264/4.33; 264/4.6; 264/4.7; 427/213.3; 427/213.31; 427/213.34; 427/213.36; 427/215
[58] Field of Search .................................... 264/4.1, 4.33, 264/4.7, 4.3, 4.6; 427/213.3, 213.31, 213.34, 213.36, 215

[56] References Cited

U.S. PATENT DOCUMENTS

| | | | |
|---|---|---|---|
| 4,224,179 | 9/1980 | Schneider | 252/316 |
| 5,324,436 | 6/1994 | John et al. | 210/638 |

OTHER PUBLICATIONS

Rao, M., Gonzalez, R.D., John, V.T., Kaplan, D., Akkara, J., "Catalytic and Interfacial Aspects of Enzymatic Polymer Synthesis in Reversed Micelles", Biotechnol. Bioeng., 41, 531 (1993).

Akkara, J.A., Ayyagari, M., Bruno, F., Samuelson, L., John, V.T., Karayigitoglu, C., Tripathy, S., Marx, K., Rao, D.V.G.L.N., Kaplan, D.L., "Biomimetic Membrane and Interface Templates for Enzyme–Based Polymerization Reactions", Biomimetrics, 2, 331 (1994).

Akkara, J.A., Kaplan, D.L., Tripathy, S.K., John, V.T., "Enzyme–Catalyzed Polymerization", in The Polymeric Materials Encyclopedia: Synthesis, Properties and Applications, Salamone, J. Ed., vol. 3, CRC Press, (1996) pp. 2115–2125.

*Primary Examiner*—Jeffrey Mullis
*Attorney, Agent, or Firm*—Vincent J. Ranucci

[57] ABSTRACT

A process is described for the enzyme catalyzed synthesis of polymeric microspheres from monomers such as ethylphenol, naphthols and hydroxypyrenes in reverse micelles in the presence of a detergent. Polymeric microspheres synthesized are porous with nonuniform densities. Polymers prepared from naphthols and hydroxypyrenes are fluorescent with electroluminescent properties. A number of materials such as enzymes, drugs and inorganic materials such as iron oxide and cadmium sulfide are encapsulated in the hollow polymeric microspheres synthesized. These encapsulations are carried out during or after the syntheses of the polymeric microspheres. Functional properties of the encapsulated materials such as enzyme, magnetic and non-linear optical properties are demonstrated in the polymeric composites.

25 Claims, 13 Drawing Sheets

(Before) (After)

POLYMER ENCAPSULATION AND POLYMER MICROSPHERE COMPOSITES

CROSS REFERENCE TO RELATED APPLICATIONS

This application claims benefit from U.S. Provisional Application Ser. No. 60/004,377 filed Sept. 27, 1995.

STATEMENT OF GOVERNMENT INTEREST

The invention described herein may be manufactured, used and licensed by or for the U.S. Government for U.S. Governmental purposes without the payment to us of any royalty thereon. This invention was made with governmental support from the U.S. Government, U.S. Army Soldier Systems Command, Natick, Mass. under Contract No. DAAK60-93-C-0005.

BACKGROUND OF THE INVENTION

The present invention relates to polymer microspheres suitable for the encapsulation, stabilization and release of biologically active molecules such as enzymes, drugs, biocides and the like. The present invention also relates to advanced materials, especially composites of polymers with organic or inorganic compounds.

BRIEF DESCRIPTION OF THE DRAWINGS

In the drawings:

FIG. 11 (a) is a graphical representation of magnetization vs. field loops of a polymer-ferrite composite at a temperature of 100 degrees Kelvin;

FIG. 11 (b) is a graphical representation of magnetization vs. field loops of a polymer-ferrite composite at a temperature of 4.5 degrees Kelvin;

SUMMARY OF THE INVENTION

We have discovered a novel method of encapsulating enzymes, other solutes or nanoparticles in a polymer matrix. A suitable polymer matrix is comprised of phenolic polymers. The phenolic polymers may be synthesized by conventional chemical processes or by enzyme catalyzed synthesis. The present invention provides composite materials that have numerous applications, including the controlled release of drugs, formulation of protective coatings and paint, and fabricating advanced materials such as nonlinear optical materials.

Polymers based on phenols and aromatic amines can be synthesized enzymatically. The polymers are enzymatically synthesized in reversed micelles. Reversed micelles are microdroplets of water sustained in an oil phase by surfactants to form a water-in-oil emulsion. Reversed micelles are suitable for solubilizing enzymes that require an aqueous environment for optimal catalytic activity. The phenolic monomers used in the present invention are amphiphilic, and partition to the oil-water interface resulting in a organized alignment of the monomers prior to polymerization. Examples of such phenolic monomers are p-ethylphenol, naphthols, and hydroxypyrenes.

The enzyme peroxidase catalyzes the oxidative coupling of a variety of substrates including phenols through activation by hydrogen peroxide. A peroxidase is thus suitable to catalyze the polymerization of polymers such as phenolic polymers. Horseradish peroxidase (HRP) is a suitable peroxidase for the polymerization of phenols and of aromatic amines.

The reversed micelle forms an environment that serves as a template during polymerization. It is believed that interactions with the surfactant at the oil-water interface encourage the folding of the polymer chains to form a mesh that conforms to the shape of the reversed micelle. As the process proceeds, the reversed micelles become joined to form larger structures called microspheres.

Materials formed by the method of the present invention display novel and unexpected properties. Enzymes thus trapped in the polymer matrix, are catalytically active. Nanoparticles entrapped in the matrix confer novel properties to the composite, for example, superparamagnetism.

A number of applications are described herein. The first application is stabilization and maintenance of enzyme activity by encapsulation in the polymer matrix. The second application is the encapsulation of nanoparticles in the matrix, with applications to advanced nanocomposite materials. The third application is the formulation of hollow microspheres for controlled release of compounds. The fourth application is the preparation of highly luminescent (both photoluminescent and electroluminescent polymers.

Phenolic polymers have a variety of conventional applications as resins for coatings, laminates, and the like. The traditional technology for making these polymers involves a formaldehyde-based high temperature process, where undesirable side reactions lead to poor control of polymer structure and molecular weight. In addition, concern over the toxicity of formaldehyde has led to the search for alternative technologies to produce such polymers.

An example is their relevance to nonlinear optics (NLO). In NLO materials, higher order terms become significant in the expansion of the material polarization in terms of an applied electric field. While details of the physics behind NLO materials can be found in several excellent sources (e.g. Prasad and Williams), the relevance of NLO polymers to applications in optical switching, waveguide technology, laser protection, etc. is well-recognized.

When the reaction is conducted in aqueous media, the limited solubility of the monomer and the even lower solubility of the dimer and trimer limit the synthesis of polymers of useful molecular weight. Hence, it is important to conduct the reaction in organic solvents that dissolve oligomers as well as the monomer. Much work has therefore been devoted to peroxidase activity in monophasic organic solvents.

The present invention provides a method for the encapsulation of solutes or particles by the formation of a polymer mesh in reversed micelles.

DESCRIPTION OF THE PREFERRED EMBODIMENTS

Figure 1:
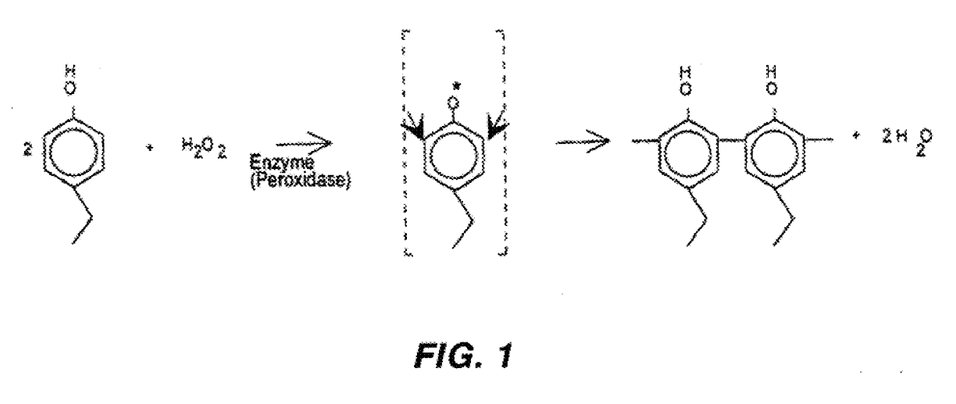
FIG. 1 is a simplified schematic of enzymatic polymerization using p-ethylphenol.

FIG. 1 is a simplified schematic of the reaction mechanism illustrating the formation of a phenoxy radical which migrates to the ortho position followed by orthocoupling. The rate of $H_2O_2$ addition and the way it is dispersed throughout the system becomes crucial to enzyme viability.

FIG. 1 also illustrates the relevance of the polymer to electrooptics. In contrast to traditional phenol-formaldehyde polymers, where there is a methylene group between the rings, the rings are directly connected in the enzymatically-synthesized material. The polymer is thus conjugated and the resulting electron delocalization along the polymer backbone confers electrooptical properties to the material.

Figure 2A:
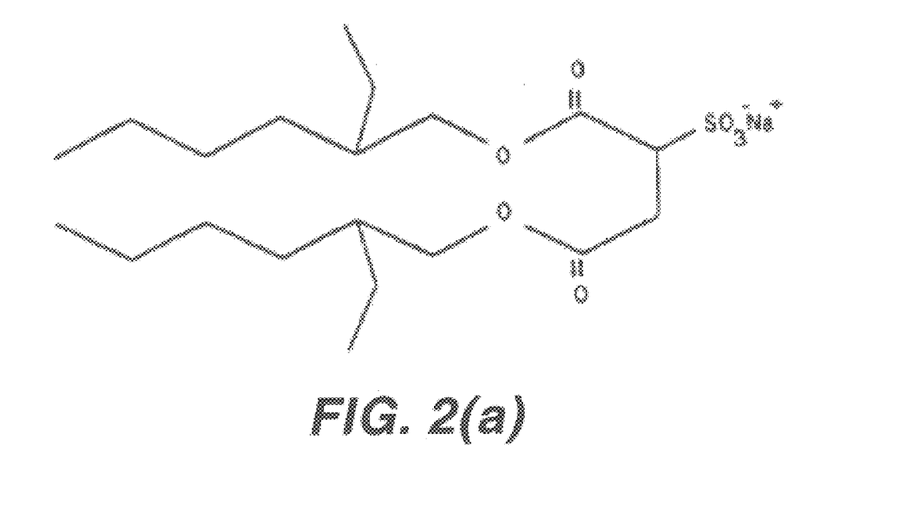
FIG. 2(a) is a representation of the structural formula of bis(2-ethylhexyl) sodium sulfosuccinate, a surfactant commonly known as AOT.
Figure 2B:
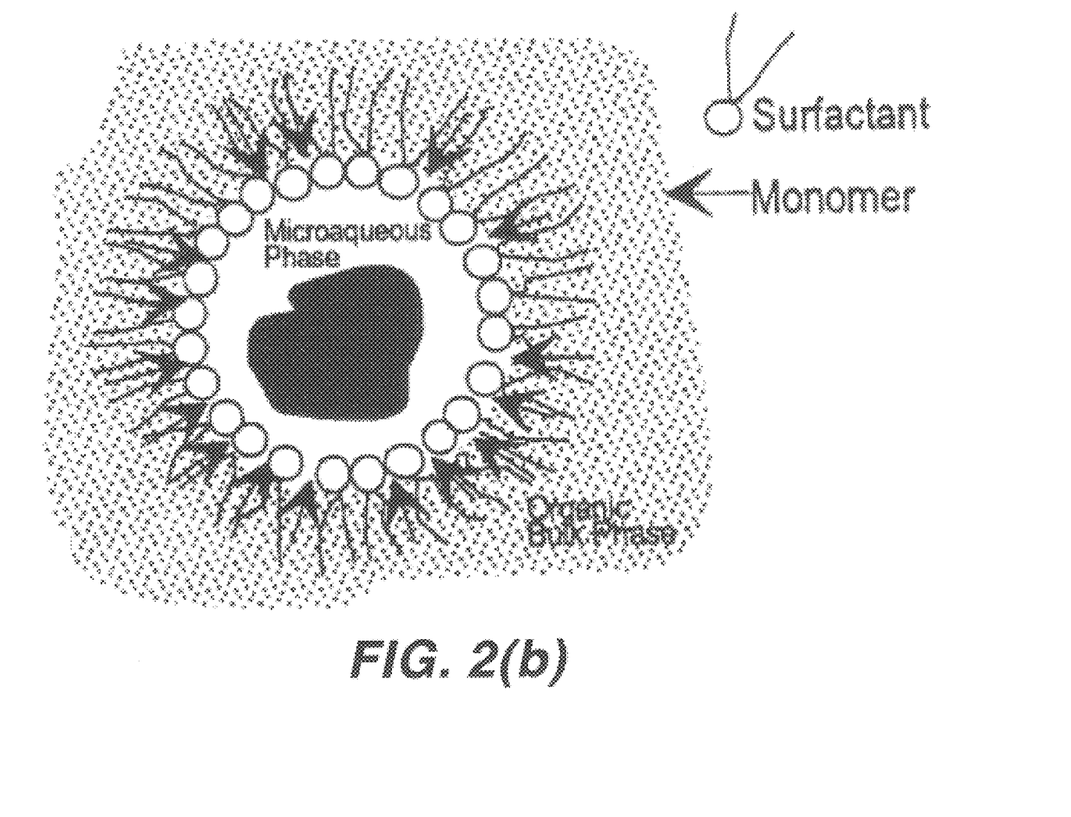
FIG. 2(b) is a diagram of a reversed micelle depicting the relationship of monomer, surfactant, microaqueous phase and organic solvent bulk phase.
Figure 3:
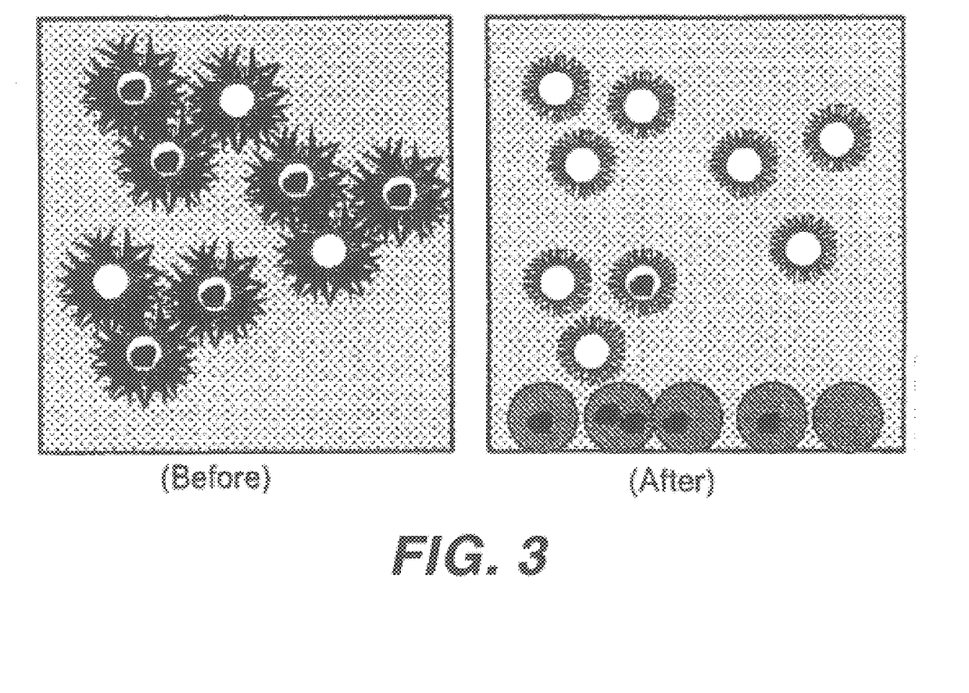
FIG. 3 is a diagram of the reversed micelle reaction system before and after the polymerization reaction illustrating enzyme entrapment.

FIGS. 2 and 3 illustrate the reversed micelle systems. The twin-tailed structural formula of the anionic surfactant bis (2-ethylhexyl) sodium sulfosuccinate, commonly known as AOT, is shown in FIG. 2(*a*). FIG. 2(*b*) illustrates the micellar environment with the enzyme encapsulated in the water pools. The head of the arrow indicating the monomer represents the polar hydroxyl group of the phenol. In the micellar environment, the phenol molecules partition to the water-oil interface. Indeed, Fourier Transform Infrared (FTIR) spectra shows a low frequency shift in the AOT carbonyl stretch as a result of hydrogen bonding with phenol hydroxyls. Dynamic light scattering results also indicate a decrease in micelle curvature through such rigidifaction of the interface. The overall schematic of the reaction system is shown in FIG. 3; note that the formed polymer microspheres and their contents ultimately precipitate out from solution.

Thus, one advantage of the present invention is the ability of our approach to polymerization is to align the monomers at the water-oil interface prior to polymerization. In such an alignment, the hydroxyl groups are on the same side of the polymer backbone, as shown in FIG. 1. The proximity of hydroxyl groups presents an opportunity indicating an ease in functionalizing the polymer, i.e., in metal chelation for the preparation of catalytic polymers, or for protein attachment.

Figure 4:
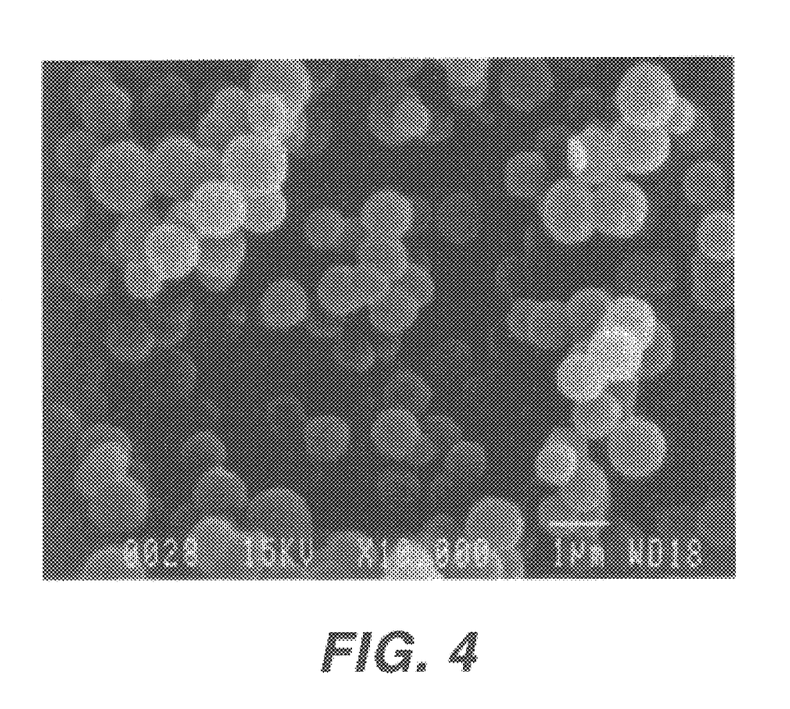
FIG. 4 is a scanning electron micrograph (SEM) of the polymer microsphere particles formed the polymerization reaction.

We have found that polymerization in reverse micelles results in monomer conversions up to 80% in less than 5 minutes. The polymer precipitate is in the form of spherical particles, both distinct, and interconnected. FIG. 4 is a scanning electron micrograph (SEM) showing such particles.

Figure 5:
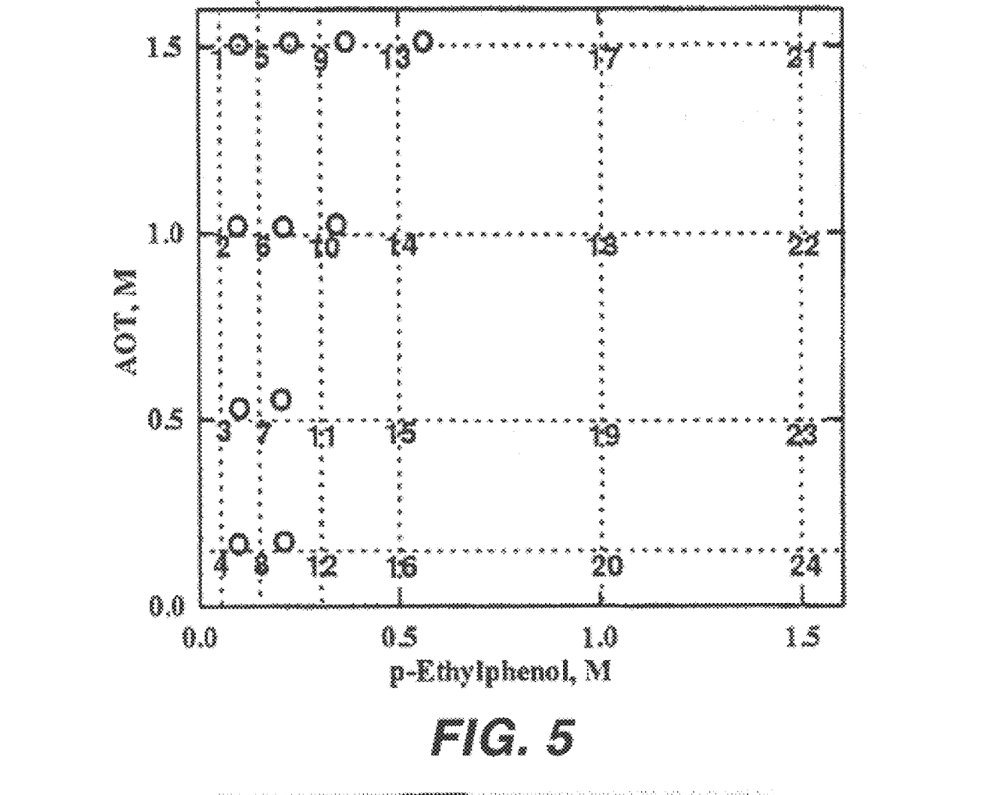
FIG. 5 is a phase diagram of AOT and p-ethylphenol with open circle indicating the compositions suitable for formation of polymer microspheres.

Spherical morphologies are generated only at specific phase compositions in the micellar system. The situation is shown in FIG. 5, circles indicate the compositions suitable for the formation of polymer microspheres. The data indicates that an AOT/p-ethylphenol ratio of 3/1 can be used as a conservative criterion to reproducibly obtain spherical particles.

When polymerization is conducted in monophasic organic solvents microspheres are not formed spherical morphologies. The micellar environment appears to act as a template during polymerization to shape the microspheres.

Alternatively the spherical morphology may be the consequence of surface energy minimization when there are no internal stress anisotropies in the particle. However, two reasons indicate that templating is indeed prevalent. First, the transition from spherical to nonspherical morphologies in FIG. 5 indicates that adequate surfactant must be present to obtain the microspheres. At the transition point 11 (FIG. 5), we see spherical particles interspersed with nonspherical particles, and when the monomer concentration is further increased, there is no evidence of spheres.

Second, it is possible to destroy morphology by dissolving the polymer in a polar solvent (e.g., dimethyl formamide (DMF) or tetrahydrofuran (THF)) and then recreate the spheres by precipitation in an AOT micellar solution. This can be done both with polymer produced in reversed micelles and polymer produced in monophasic organic solvents. Precipitation in a surfactant-free nonpolar solvent (e.g., isooctane) does not recover the spherical morphology. This suggests surfactant-induced folding of polymer chains, perhaps; as a consequence of hydrogen bonding interactions between polymer hydroxyl groups and the surfactant carbonyl and sulfonate groups. The polymer microsphere morphology is retained as adsorbed surfactant is washed off the polymer particles.

In the following examples, we have used the phase composition AOT 0.5 M and p-ethylphenol 0.15 M for reproducible spherical morphologies, with a $w_0$ (water to AOT molar ratio) of 15. The enzyme level in synthesis was set at 1 mg/ml solution. Usually $H_2O_2$ additions are set at 30% excess of the stoichiometric requirement (0.2 M added in 3 aliquots, to minimize enzyme deactivation).

The size of the polymer particles, 200–800 nm on average, is much larger than the reversed micelle diameter, which varies from 5–15 nm, depending on the water content. This indicates that the particles are not just the consequence of growth around the periphery of the micelle.

Figure 6:
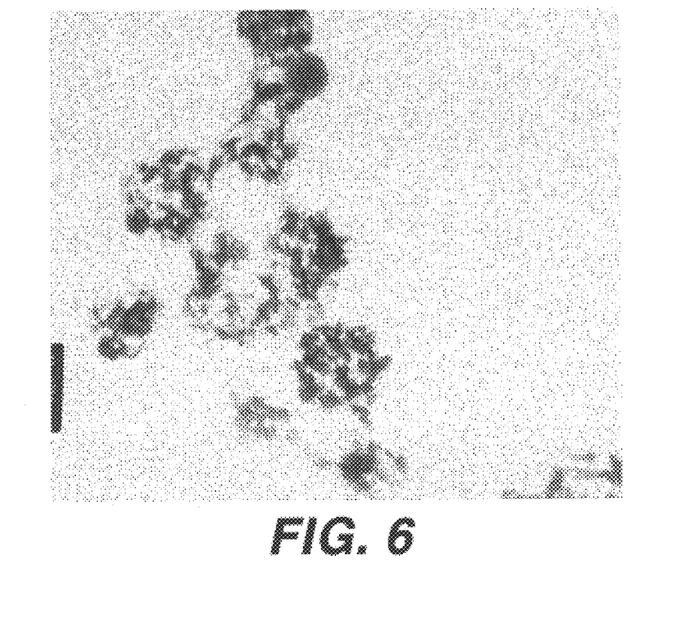
FIG. 6 is a transmission electron micrograph (TEM) of polymer particles formed after a five minutes polymerization reaction in which 25% of the monomer was converted.

Monomer conversion follows the reaction stoichiometry (FIG. 1) quite closely. By controlling the amount of $H_2O_2$ added, it is possible to monitor morphology development. FIG. 6 is a transmission electron micrograph of an early stage. Sufficient $H_2O_2$ was added to complete 25% conversion of a 0.15 M p-ethylphenol monomer and the precipitate was collected after 5 minutes. The development of overall sphericicity can be seen. The interconnected spheres are not of uniform density but made up of dark patched, which are approximately of the size of the reversed micelle. Realizing that the micellar system is dynamic with exchange of material between micelles as a result of micellar collisions, it is believed that the resulting polymer microsphere particles are made up of clusters of smaller particles that may have their origin through growth on the micelle periphery.

Figure 7:
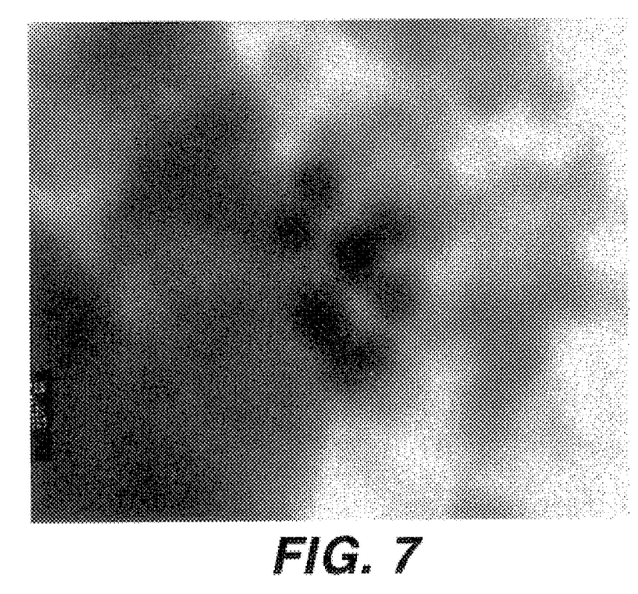
FIG. 7 is a transmission electron micrograph (TEM) of polymer particles showing gold-labeled peroxidase in the polymer matrix.

The enzyme is trapped in the polymer microspheres and removed from the reversed micelles. The peroxidase is trapped in the polymer as it precipitates, as schematically shown in FIG. 3. In this example a small amount of gold-labeled peroxidase was added to the reversed micellar reaction mixture. The electron-dense gold particles are seen as the dark spots in the transmission electron micrograph of the polymer microspheres (FIG. 7).

Figure 15:
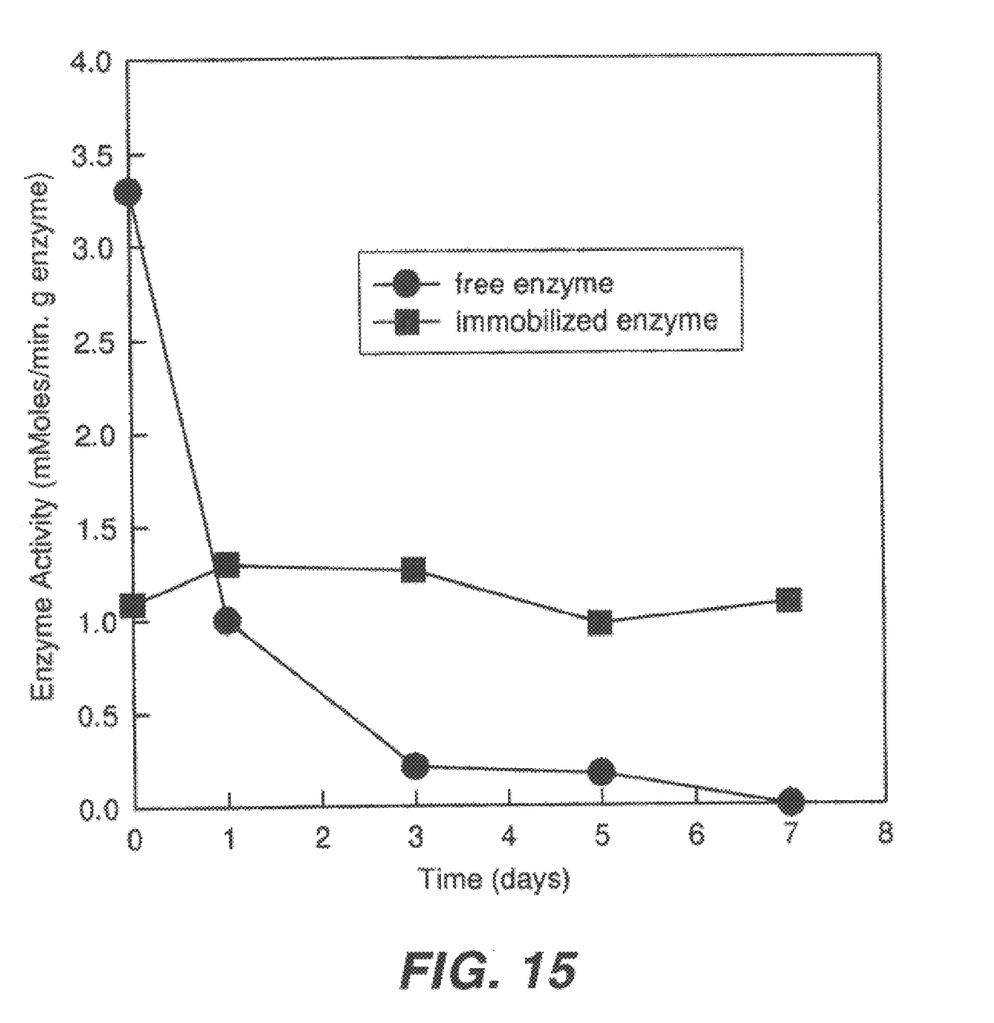
FIG. 15 is a graphical representation of the activity of phosphodiesterase (measured by the hydrolysis of (bis) p-nitrophenylphosphate to form p-nitrophenol as monitored by absorbance at 405 nm) as free enzyme (circles) and encapsulated in polymer microspheres (squares).

In a separate example, a marker enzyme (e.g., cytochrome c) cosolubilized in the micelles is also essentially completely removed from the micelles and trapped in the polymer matrix, as shown by the loss of absorbance of the marker in the supernatant after reaction (FIG. 15).

The enzyme trapped in the polymer microspheres stays catalytically active. In another example, precipitated polymer microspheres with trapped peroxidase were recovered and contacted with a fresh reaction mixture (reversed micellar solution with monomer but without enzyme). Rapid polarization occurred, up to 80% of the initial rate catalyzed by naked peroxidase in reversed micelles. This indicates that the polymer encapsulated enzyme is capable of further catalysis.

Figure 8A:
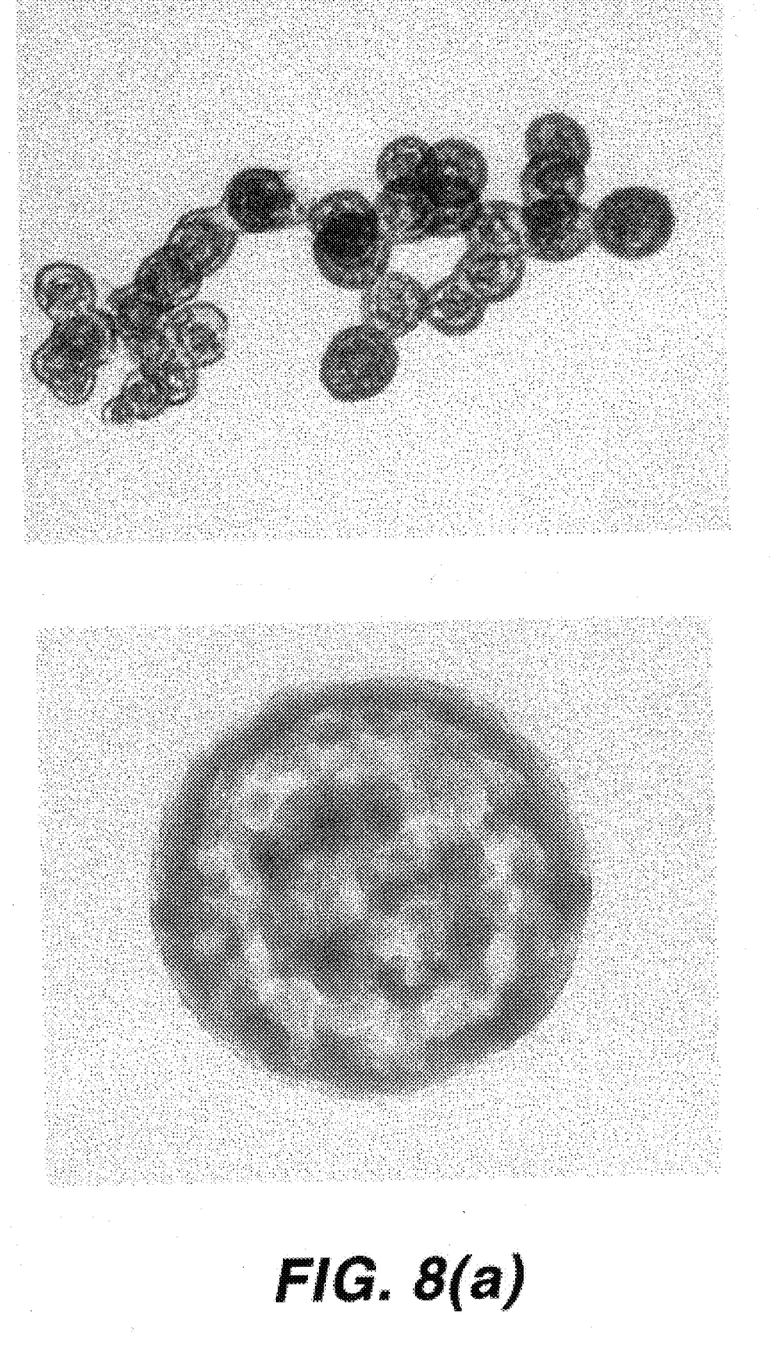
FIG. 8(a) is a transmission electron micrograph (TEM) of polymer particles formed after a thirty minutes polymerization reaction.
Figure 8B:
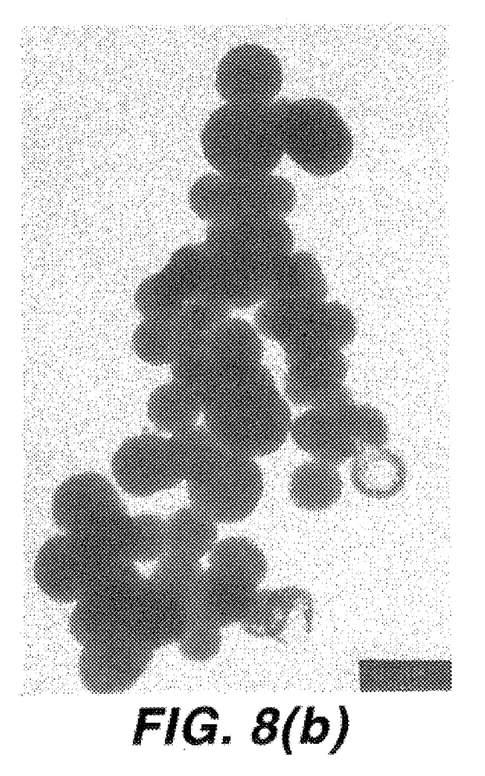
FIG. 8(b) is a transmission electron micrograph (TEM) of polymer particles formed after a polymerization reaction sufficient to achieve full denisification.

The internal density of the polymer microspheres can be controlled by reagent concentration and the duration of reaction. The catalytic activity of trapped peroxidase leads to an interesting observation. Within 5–30 minutes of reaction initiated by $H_2O_2$ added to at least the 100% stoichiometric requirement, the measured monomer conversion is greater than 80%, and a significant polymer precipitate is recovered. Electron micrography of the produced polymer reveals that the overall morphology has already developed at these conversion levels. However, at these short reaction times, direct TEM imaging revealed that the particles resemble spherical shells with openings and diffuse interiors. FIG. 8(a) illustrates this morphology. Both a cluster of interconnected particles at magnification (×75,000) and a single particle at a higher magnification (×133,000) are shown in FIG. 8(a). With longer reaction times there was a dramatic increase in internal density. After about 4–5 hours reaction time, about 50% of the particles appeared dense to the electron beam. After 24 hours the interior reaction time of all particles was completely dense, as shown in FIG. 8(b) (magnification ×133,000).

The increased density is clearly the result of continued polymerization catalyzed by the entrapped enzyme. This probably occurs due to residual monomer, which we assume, can much more easily access the active site than the relatively immobile polymer chains. Polymer molecules may become activated through radical transfer from the monomer to the more resonance stabilized chains, the chains may cross link or extend as a result of further monomer attachment.

The densification can be stopped simply by removing the polymer precipitate after 5–15 minutes reaction and thoroughly washing the precipitate with isoctane and water to remove residual monomer and $H_2O_2$. A better method of controlling densification is to simply reduce $H_2O_2$ addition to 80–90% of stoichiometric requirement for complete monomer conversion. Thus, the internal density of the polymer particles can be controlled.

Figure 9A:
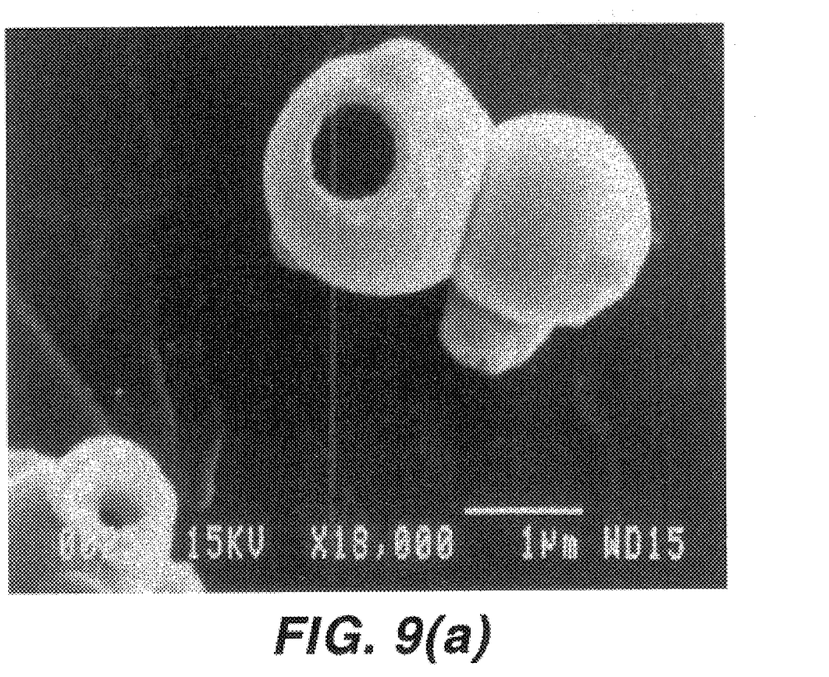
FIG. 9(a) is a transmission electron micrograph (TEM) of polymer particles with a hollow interior formed by sonication of the polymer microspheres.
Figure 9B:
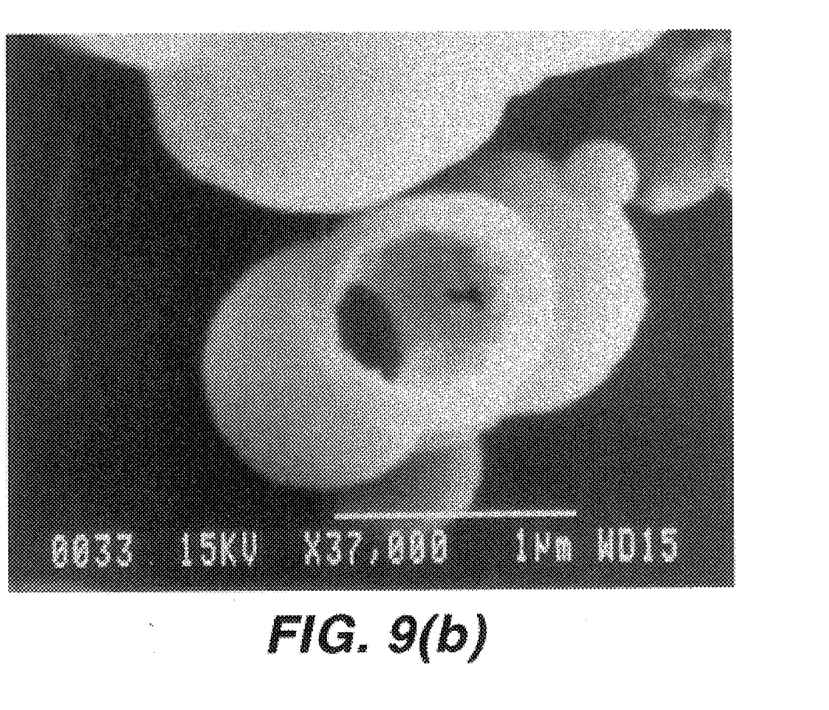
FIG. 9(b) is another transmission electron micrograph (TEM) of polymer particles with a hollow interior formed by sonication of the polymer microspheres.

It has been found that ultrasonication of the diffuse polymer particles obtained at short reaction times results in breakage of connection points and/or eruption of internal material out of the particle, leaving hollow shells behind. The scanning electron micrographs of FIGS. 9(a) and 9(b) illustrate such polymer microspheres with apparently hollow interiors obtained as a result of mild sonication.

Reversed micelles have been proposed as a microenvironment within which to synthesize inorganic material that do not grow beyond the nanometer size range. Enhanced band-gap semiconductor materials ($CdS$, $TiO_2$), magnetic particles, and the like are examples of novel nanoparticles that have been synthesized in reversed micelles; their synthesis and properties are known in the art.

We made polymer-nanoparticle composites by first synthesizing the nanoparticles in the reversed micelles, then adding monomer, enzyme, and $H_2O_2$ to initiate polymer synthesis. When the polymer microspheres precipitate out they incorporate a significant amount of the nanoparticles.

In one example, particles of superparamagnetic iron oxide have been synthesized in reversed micelles. In such synthesis, the particle size approaches magnetic domain size, leading to thermally induced randomization of magnetic dipole orientations. The particles, therefore, do not exhibit magnetic characteristics in the absence of a field. The term superparamagnetism is usually applied to particles which are nonmagnetic in the absence of a field as paramagnetic materials are, but upon application of an external field exhibit magnetization far in excess of paramagnetic materials.

Figure 10:
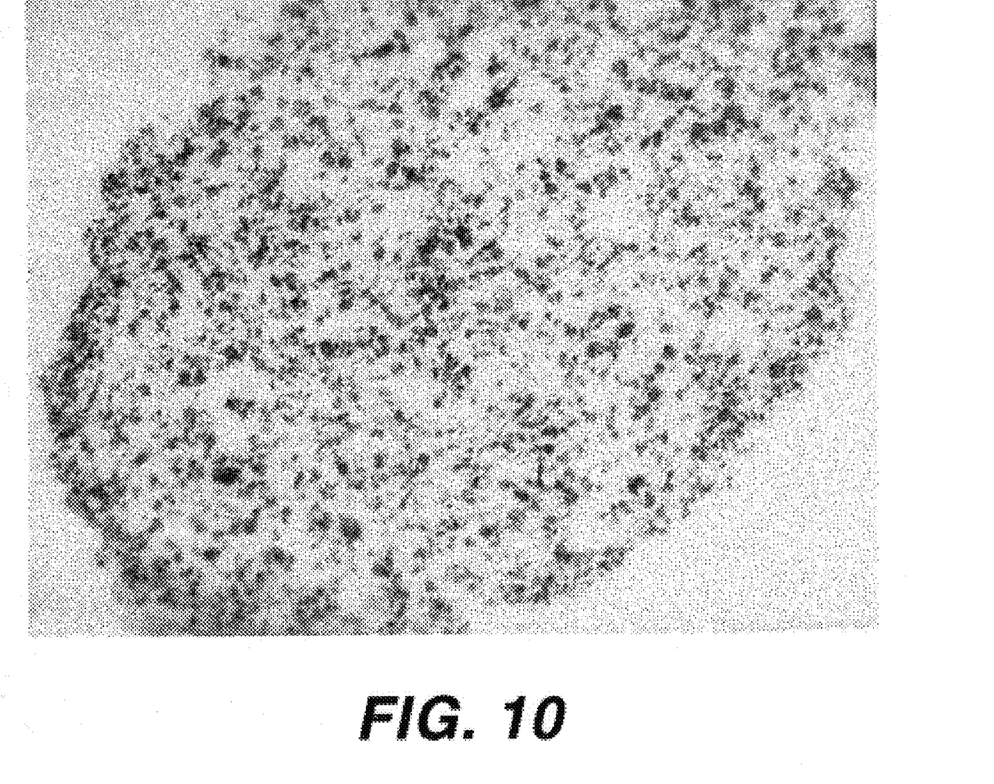
FIG. 10 is a transmission electron micrograph (TEM) of a cross-section of a polymer microsphere containing ferrite nanoparticles.

We have then incorporated these particles into the polymer as described above, allowing polymerization to continue to yield dense microspheres. FIG. 10 is a transmission electron micrograph of a cross-section of a polymer particle. The dark specks are the ferrite particles uniformly distributed across the section. The cross-section also indicates a significant amount of ferrite entrapment (up to 6% of the polymer weight). The particle size increases upon incorporation of the nanoparticles. The particle deformation in the micrograph is an artifact of the sectioning procedure.

Figure 11A:
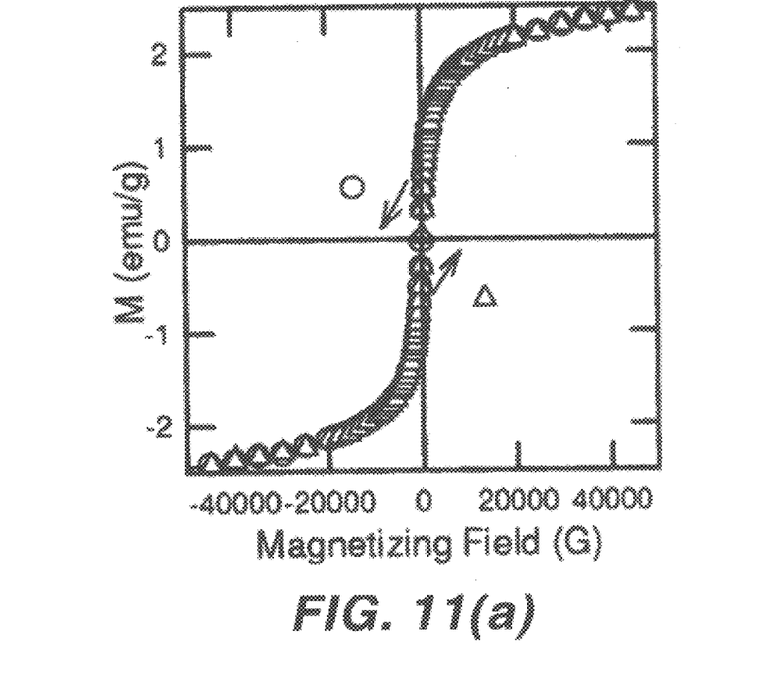
Figure 11B:
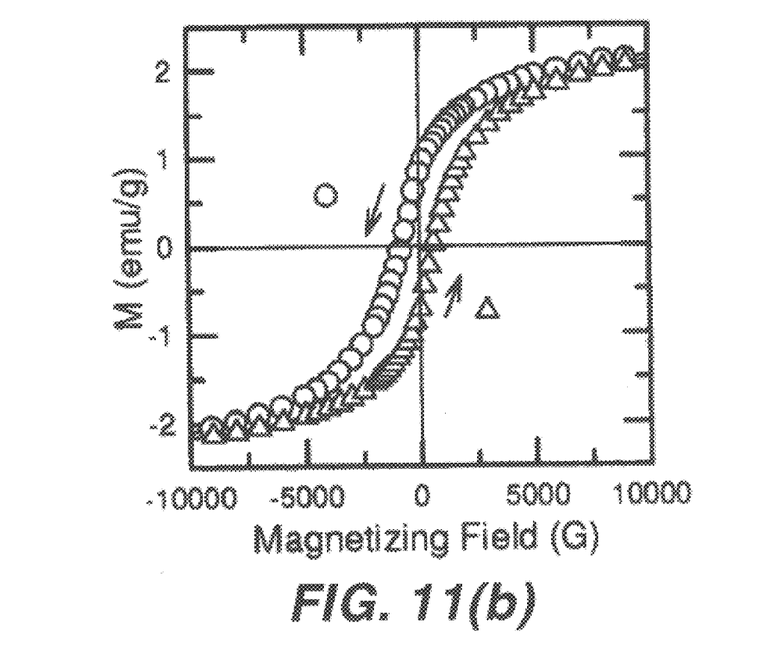

The composite polymer iron oxide material had superparamagnetic properties. Magnetization loops for the material, as generated by a superconducting quantum interference device (SQUID) are illustrated in FIGS. 11 (a) and 11 (b). The magnetization vs. field data at 100 degrees Kelvin illustrates that the data is perfectly superimposable as the field is cycled between ±50 kG, with the coercivity $H_c$=0. This lack of hysteresis is characteristic of superparamagnetic particles or some singledomain particles of very small dimensions. The particles have very small volumes, and thermal fluctuations are sufficient to overcome the anisotropy energy barrier, allowing the magnetization to spontaneously reverse direction. As the temperature is significantly lowered to 4.5 degrees K, the sample starts to display some hysteresis with coercivity $H_c$ about equal to 700 G (FIG. 11 (b)), as the thermal energy is insufficient to overcome the anisotropy energy barrier.

Iron oxide (ferrite) encapsulated in the polymer matrix is suitable for use in magnetic coatings and information storage, color imaging, magnetic chromatography and separations, magnetic refrigeration and ferrofluids, and magnetic resonance imaging. Iron oxide encapsulated in the polymer matrix with specific antibodies is suitable for magnetic isolation, separation and purification of specific antigen containing cells and other biological materials.

The method of preparing polymer-iron oxide composites can be generalized to other oxides. Indium oxide can be incorporated into the polymer matrix to make conductive coatings that are relatively flexible and do not easily flake off as direct metal oxide coatings do. Conductive coatings have applications as charge dissipation systems in minimizing electrostatic charge build up.

Semiconductor nanoparticles may also be incorporated into the polymer matrix.

Soluble polymer has been added to reversed micelles. The presynthesized soluble polymer added to the reversed micelle emulsions encapsulated the intramicellar solutes and precipitated as polymer microspheres containing those solutes.

A polymer was prepared by polymerization of p-ethylphonol in a water in oil reversed micelle system (0.5M AOT in isooctane, $w_0=15$). A typical reaction mixture composition was 0.15 M p-ethylphenol, an equimolar amount of hydrogen peroxide and 0.5 mg/ml of enzyme (HRP). The reaction was carried out for 10–15 minutes. The reaction mixture was centrifuged, the precipitated collected and washed with isooctane. The precipitated polymer particles were resuspended in isooctane and subjected to mild sonication for 5–10 minutes. The sample was then removed from the sonication bath, dried in the vacuum oven and stored for future use.

Tetracycline was dissolved in water to make a concentrated solution (0.01 g/ml). A small amount (2 ml) of this concentration solution was then added to the dried carrier polymer powder (0.1 g), such that the polymer was completely wetted with the solution.

The thick slurry of the polymer suspension was then agitated for some time to allow proper mixing and finally dried in vacuum oven.

The dried polymer with the trapped tetracycline was accurately weighed and redispersed in a measured volume of water. The suspension was kept agitated by stirring (magnetically). Aliquot of the aqueous suspension were collected over regular intervals of time and assayed for tetracycline content (UV absorbance). Prior to measurement, however, the solution was centrifuged and the supernatant filtered.

Enzymes encapsulated in polymer-microspheres have been shown to be catalytically active and stable. Enzymes were first co-solubilized in reversed micelles with horseradish peroxidase, following which, poly (p-ethylphenol) was enzymatically synthesized. A specific example is the cosolubilization of enzymes which break down organophosphorus compounds. Organophosphorus acids (OPA) and their salts are toxic compounds. Organofluorophosphonates, for example, are extremely toxic and constitute chemical warfare nerve agents such as soman and sarin. Organophosphonates, organophosphinates, and organophosphates include other compounds of this class, which include insectides and pesticides such as parathion, paraoxon, and malathion are considerably less toxic and are often used as surrogates in evaluating decontamination technologies.

Organophosphorus acid hydrolases or phosphotriesterases are able to function in vitro without any cell-mediated cofactors.

We have studied commercially available phosphodiesterase from *Crotalus ctrox* (Sigma Chemical Company, St. Louis, Mo.) (FIG. 15). The enzyme, when encapsulated in the polymer microspheres showed activity, releasing nitrophenol (measured by the increase in absorbance at 405 nm) from bis (para-nitrophenyl) phosphate with a rough initial rate of 10–12 $\mu$moles nitrophenol produced/mg enzyme/min.

The present invention has been applied to luminescent aromatic monomers to produce highly luminescent polymers. Aromatic compounds, in particular fused ring species, exhibit fluorescence. In addition, polymers and copolymers from multiring or fused ring phenols (e.g.naphthols and hydroxypyrenes) are also electroluminescent. Pyrene, for example, has been studied extensively as a probe of molecular environment, since it has a long singlet lifetime, is able to act as an energy acceptor, and its emission characteristics are sensitive to the chemical environments. But our objective is to enzymatically prepare polymers out of these fluorescent aromatics and attempt to control luminescence over a broad spectral range. The attachment of semiconductor nanoparticles (e.g. CdS) to these polymers expands the applications of these polymers. Fluorescent polymers have applications in optical recording and photolithography, luminescent solar concentrators, laser materials, and even paints and varnishes.

Figure 12:
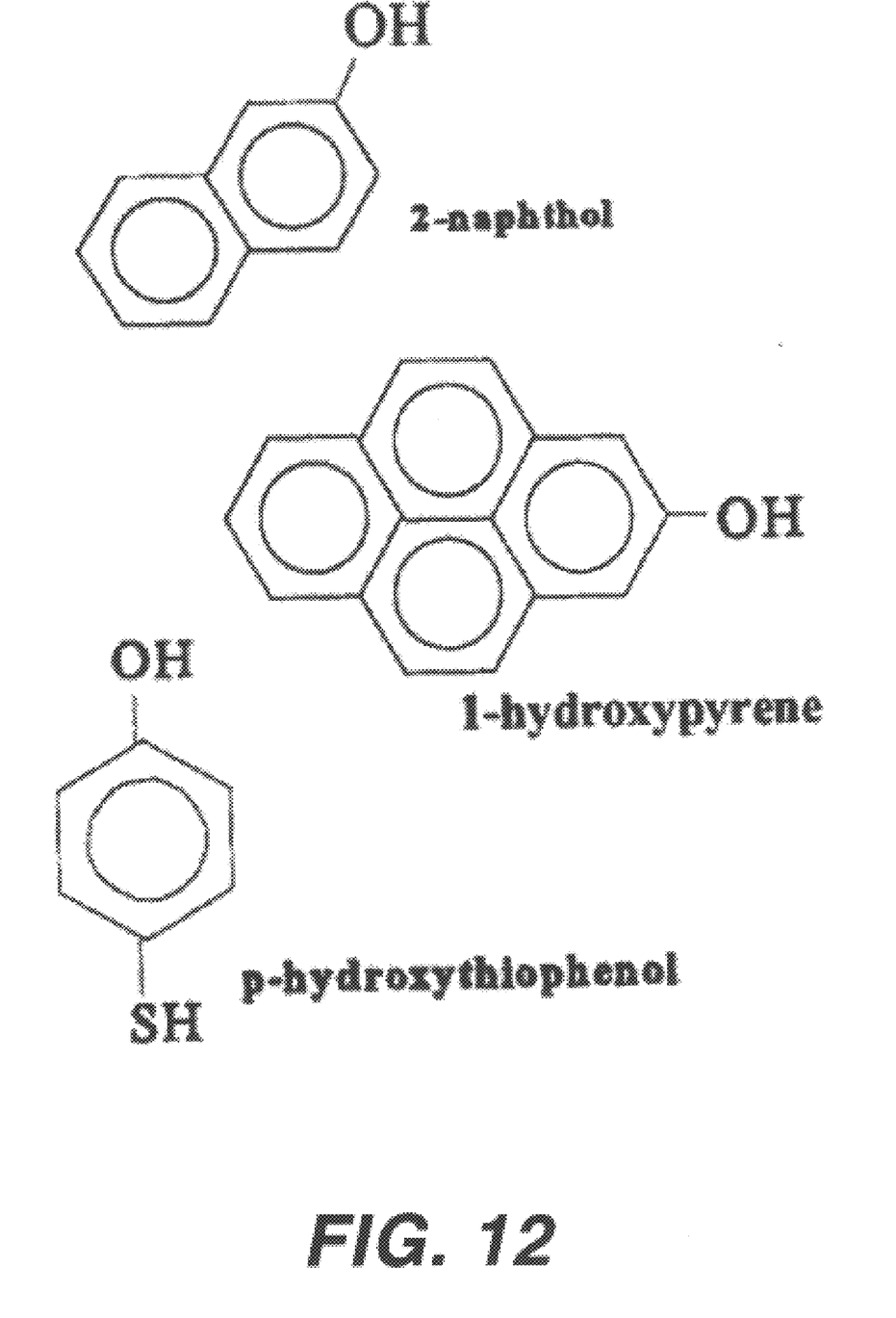
FIG. 12 is representation of the structural formulas of other monomers suitable for enzymatic polymerization.
Figure 13:
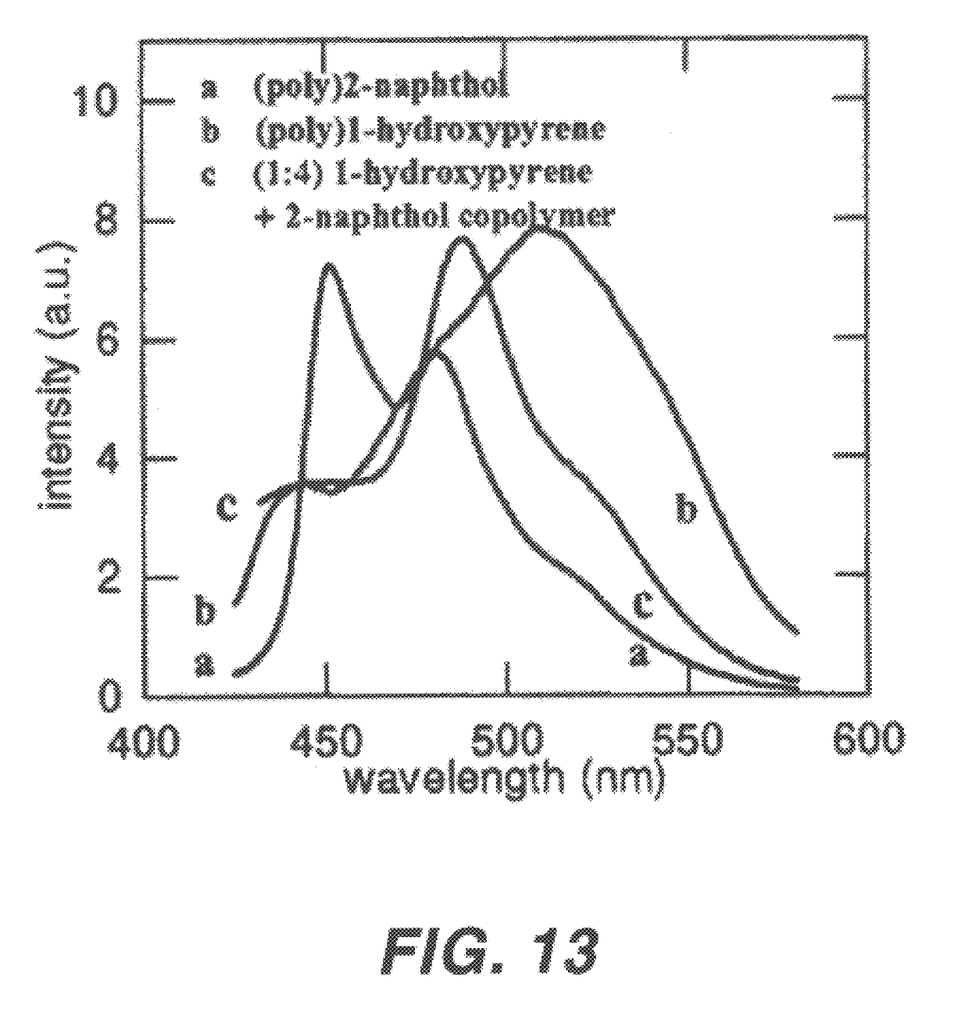
FIG. 13 is a graphical representation of the fluorescence spectra of 2-naphthol and 1-hydroxypyrene polymers and copolymers, excitation at 413 nm.
Figure 14:
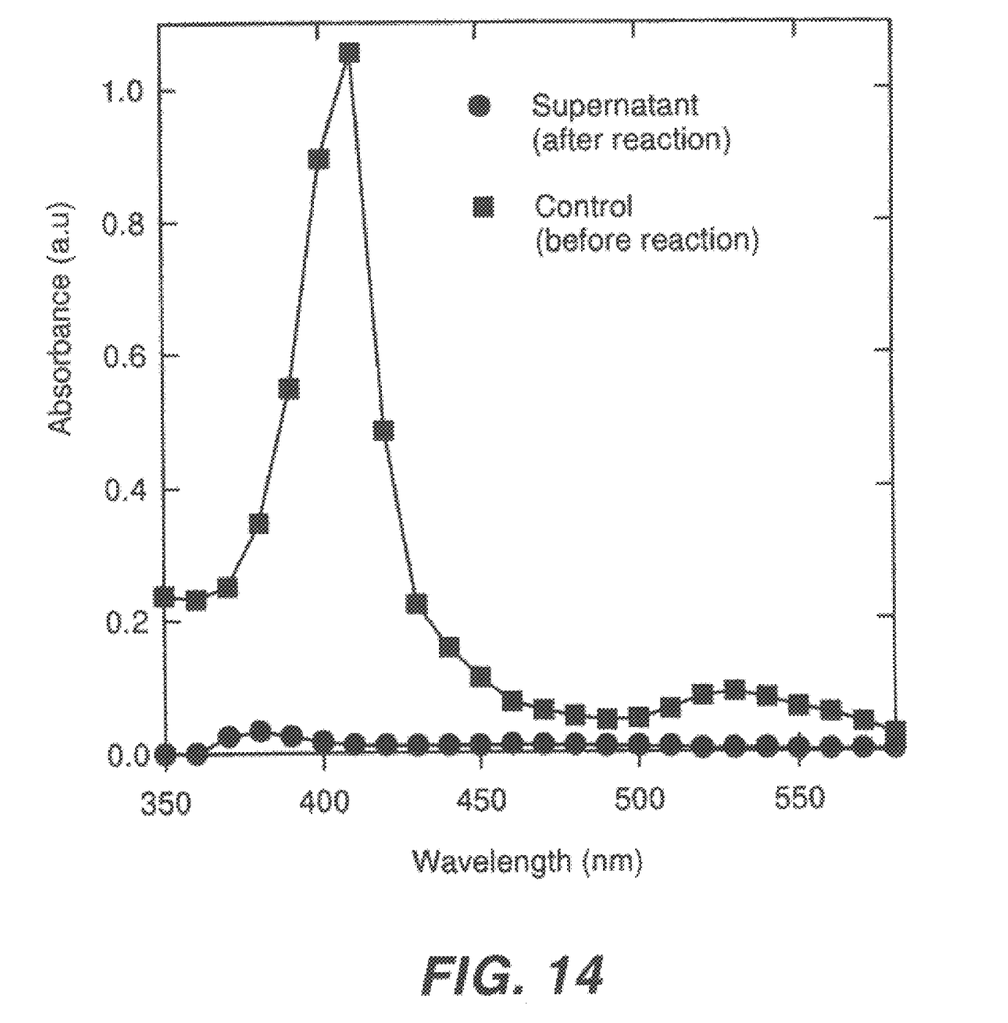
FIG. 14 is a graphical representation of the absorbance spectra of cytochrome c, showing polymerization and encapsulation of the enzyme by the reduction in the absorbance peak at 420 nm as the microspheres precipitate out of the micellar supernatant.

Polymers have been made with 2-naphthol and 1-hydroxypyrene in reversed micelles (the monomer structures are shown in FIG. 12). The polymers are photophysically active and the fluorescence spectra shown in FIG. 14 indicates a significant Stokes shift ranging from about 40 nm (peak at about 450 nm for (poly) 2-naphthol) to about 100 nm (peak at 510 nm for (poly) 1-hydroxypyrene). The copolymer's emission peak lies at an intermediate frequency, indicating that copolymer composition can be used to manipulate emission frequencies.

Enhanced band-gap semiconductor nanoparticles are also suitable for polymer encapsulation. Thiol groups bind irreversibly to nanoparticle CdS and CdSe and are often used to cap surface emissions. First CdS is nucleated in the micelles using well established and simple procedures (bubbling $H_2S$ through $CdCl_2$ containing micelles or mixing $CdCl_2$ micelles with $Na_2S$ micelles). Then hydroxythiophenol (FIG. 12) is used as the monomer for enzymatic polymerization. The monomer binds to CdS and the polymer formed carries the CdS or CdSe with it. Thus this method provides not just an encapsulation of the nanoparticles but a composite material with the CdS or CdSe covalently linked to the polymer. The attachment of CdS or CdSe to the polymer enhanced the red-shift in fluorescence emission. Nanoparticle CdSe for example, emits at a wavelength between 580–620 nm (excitation at 514 nm) depending on particle size.

The present invention is suitable for chromatographic packing material because of account the morphology and particle structure of the polymer. Phenolic polymers may be very effective in binding to hard-to-separate substituted amines through hydrogen bonding of the acidic hydroxyls to amine functionalities.

What is claimed is:

1. A method of preparing, a polymer microsphere containing an encapsulated substance, comprising the steps of:
   (a) admixing a first solution comprising at least one polymerizing agent in an aqueous buffer solution with a second solution comprising at least one surfactant dissolved in a liquid hydrocarbon solvent to form a reversed micellar solution;
   (b) dissolving at least one monomer capable of being polymerized in the reversed micellar solution to provide an internal reaction medium comprising the admixture;
   (c) polymerizing the monomer to form a polymer microsphere, wherein density of the prepared polymer microsphere is controlled, and the polymer microsphere is isolated;

(d) sonicating the prepared polymer microsphere; and (e) filling the sonicated polymer microsphere by contacting the sonicated polymer microsphere with solution of a substance.

2. The method of claim 1, wherein the polymer microsphere is isolated by filtration.

3. The method of claim 1, wherein the prepared polymer microsphere is porous.

4. The method of claim 1 wherein an encapsulated substance is an active enzyme.

5. The method of claim 1, wherein a polymerizing agent is an enzyme.

6. The method of claim 1, wherein the substance is tetracycline.

7. The method of claim 1 wherein the encapsulated substance is an inorganic material.

8. The method of claim 1, wherein the encapsulated substance is a semiconducting material.

9. The method of claim 1 wherein the encapsulated substance is iron oxide.

10. The method of claim 1 wherein monomer is a multiring phenol.

11. The method of claim 10 wherein said multiring phenol is naphthol.

12. The method of claim 10 wherein said multiring phenol is hydroxypyrene.

13. The method of claim 10 wherein the prepared polymer microsphere is porous.

14. The method of claim 10 wherein the prepared polymer is photoluminescent.

15. The method of claim 10 wherein the prepared polymer is electroluminescent.

16. The method of claim 10 wherein the encapsulated substance is a semiconducting material.

17. A method of preparing a polymer microsphere containing an encapsulated substance, comprising the steps of;

(a) combining at least one surfactant with a liquid hydrocarbon solvent to form a reversed micellar solution;

(b) admixing said reversed micellar solution with said substance to be encapsulated to form an admixed reversed micellar solution containing the substance as an intramicellar solute;

(c) dissolving at least one presynthesized polymer in a solvent to form a polymer solution, said polymer having the characteristic of being insoluble in the reversed micellar solution; and (d) adding the polymer solution to the admixed reversed micellar solution wherein such addition causes formation of precipitated microspheres of said presynthesized polymer containing said encapsulated substance.

18. The method of claim 17, wherein the polymer microsphere is isolated by filtration.

19. The method of claim 17 wherein density of the prepared polymer microsphere is controlled.

20. The method of claim 17 wherein the prepared polymer microsphere is porous.

21. The method of claim 17 wherein an encapsulated substance is an active enzyme.

22. The method of claim 17 wherein the substance is tetracycline.

23. The method of claim 17 wherein an encapsulated substance is an inorganic material.

24. The method of claim 23 wherein said inorganic material is semiconducting material.

25. The method of claim 23 wherein said inorganic material is iron oxide.

* * * * *